United States Patent
Narasimhan

(10) Patent No.: US 9,265,020 B2
(45) Date of Patent: *Feb. 16, 2016

(54) SUPPORTING IDLE STATIONS IN WIRELESS DISTRIBUTION SYSTEMS

(75) Inventor: Partha Narasimhan, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/417,102

(22) Filed: Mar. 9, 2012

(65) Prior Publication Data

US 2012/0170499 A1   Jul. 5, 2012

Related U.S. Application Data

(63) Continuation of application No. 11/830,752, filed on Jul. 30, 2007, now Pat. No. 8,155,054.

(51) Int. Cl.
  *H04W 52/02* (2009.01)
  *H04W 60/00* (2009.01)
  *H04W 4/12* (2009.01)

(52) U.S. Cl.
  CPC .......... *H04W 60/00* (2013.01); *H04W 52/0216* (2013.01); *H04W 52/0219* (2013.01); *H04W 4/12* (2013.01)

(58) Field of Classification Search
  None
  See application file for complete search history.

(56) References Cited

U.S. PATENT DOCUMENTS

| | | | |
|---|---|---|---|
| 7,752,330 B2 | 7/2010 | Olsen et al. | |
| 8,155,054 B2 | 4/2012 | Narasimhan | |
| 2005/0210101 A1 | 9/2005 | Janik | |
| 2007/0253399 A1* | 11/2007 | Deshpande et al. | 370/347 |
| 2007/0264955 A1* | 11/2007 | Tsai et al. | 455/186.1 |
| 2008/0052366 A1 | 2/2008 | Olsen et al. | |
| 2008/0052548 A1 | 2/2008 | Olsen et al. | |
| 2008/0123577 A1 | 5/2008 | Jaakkola et al. | |
| 2008/0310391 A1 | 12/2008 | Schneidman et al. | |
| 2009/0052362 A1* | 2/2009 | Meier et al. | 370/311 |
| 2009/0296618 A1 | 12/2009 | Wang et al. | |
| 2011/0039607 A1 | 2/2011 | Karaoguz et al. | |

OTHER PUBLICATIONS

Allan Thomson, Cisco Systems; Traffic Filtering and Sleep Mode; IEEE P802.11-07/2169r0; Jul. 2007.
U.S. Appl. No. 11/830,752, Non-Final Office Action, mailed Jun. 9, 2010.
U.S. Appl. No. 11/830,752, Final Office Action, mailed Nov. 3, 2010.
U.S. Appl. No. 11/830,752, Non-Final Office Action, mailed Jul. 6, 2011.
U.S. Appl. No. 11/830,752, Notice of Allowance, mailed Jan. 13, 2012.

* cited by examiner

*Primary Examiner* — Mohammad Adhami
(74) *Attorney, Agent, or Firm* — Mannava & Kang, P.C.

(57) ABSTRACT

One embodiment described herein, a method of supporting wireless stations in a wireless distribution system having a portal and one or more access points is described. The method comprises accepting by a first access point (AP) a set of filters from a station; receiving by the first AP signaling that the station enters into an idle mode and signaling the same to a server in the wireless distribution system; forwarding by the first AP the set of filters to the server, the set of filters being applied to messages directed to the station received by the server in the wireless distribution system; receiving a buffered message for the station from the server in response to the buffered message matching at least one of the set of filters; and forwarding the buffered message to the station in response to receiving the buffered message from the server.

21 Claims, 2 Drawing Sheets

SUPPORTING IDLE STATIONS IN WIRELESS DISTRIBUTION SYSTEMS

RELATED APPLICATIONS

The present application claims priority from U.S. application Ser. No. 11/830,752, filed on 7 Jul. 2007, now U.S. Pat. No. 8,155,054, the entire contents of which are incorporated by reference herein.

BACKGROUND OF THE INVENTION

The present invention pertains to wireless local area networks (WLANs), and more particularly, to methods of supporting idle stations in WLANs and wireless distribution systems (DS) operating under IEEE 802.11 standards.

In wireless local area networks, such as networks using the 802.11 model, consist of stations (STA) which are associated with access points (APs), which are in turn connected to a distribution system (DS). It should be noted that the DS is an abstract concept, and is not restricted to a particular implementation or technology.

FIG. 1 shows a wireless DS connected to a wired network as known to the art. DS 100 connects to wired network 200 through portal 110. Access points, 112, 114, 116, 118 provide wireless access to stations 120, 122, 124. As is known to the art, when a station associates with an AP, the DS is notified of this event so that incoming packets destined for the station are routed to the proper AP for delivery.

When a station is associated with an AP, such as station 124 associated with AP 116, implicit information is exchanged in order to keep the association state alive at both ends. For example, a STA may indicate to the AP that it is either going into power-save state or out of it by either setting bits in regular messages it sends to the AP or by sending a NULL data frame (a data frame with no payload) with bits in the header indicating change of state. The AP may set specific bits in the TIM (traffic indication map) information element in its beacons informing stations in power-save state that there may be packets buffered for them at the AP. Even though no explicit keepalive messages are exchanged, there is an expectation that an active connection be maintained by the station at all times.

In draft submission, document IEEE 802.11-07/2169r0 to the IEEE P802.11 group titled "Traffic Filtering and Sleep mode" on wireless LANs (incorporated herein by reference), a set of protocols and messages for supporting traffic filtering and idle mode is proposed. While the draft defines messages and behavior, it does not specify implementation details. Under the proposal, a station associated with an AP may specify filter parameters indicating what traffic it wishes to accept. When the station goes into sleep mode, it is no longer associated with a particular AP. The station is paged when traffic passing the pre-established filter criteria is met. When the station wakes from the sleep state, it reassociates with an AP.

BRIEF DESCRIPTION OF THE DRAWINGS

The invention may be best understood by referring to the following description and accompanying drawings that are used to illustrate embodiments of the invention.

DETAILED DESCRIPTION

Figure 1:
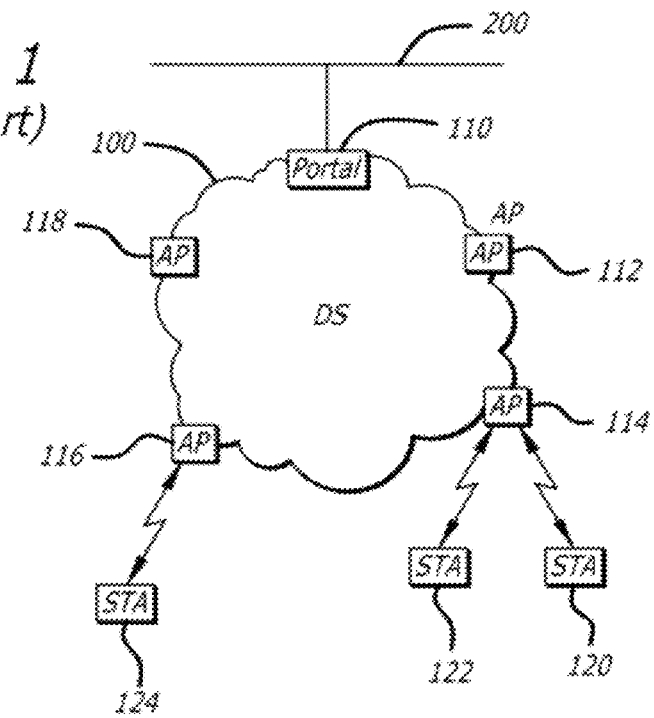
FIG. 1. shows a block diagram of a wireless distribution system (DS) as known to the art.
Figure 2:
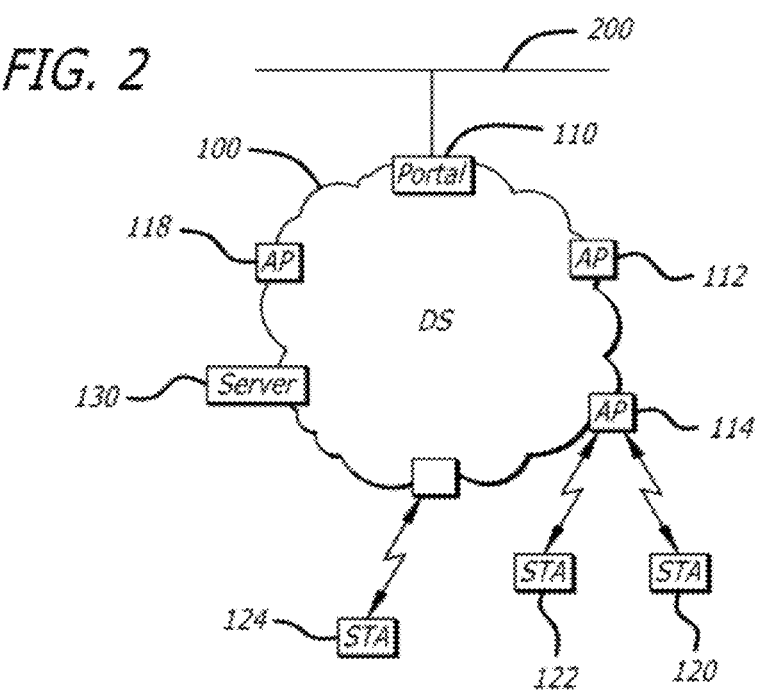
FIG. 2 shows a block diagram of a DS including a paging server.

Embodiments of the invention relate to a distribution system (DS) in a wireless IEEE 802.11 data network. In an embodiment of the invention, as shown in FIG. 2, sleep mode server 130 appears to DS 100 as another access point (AP). In operation, when a station such as station 124 goes into idle mode, it is associated with server 130. Once this association is made, DS 100 will direct traffic destined for station 124 to server 130. Server 130 buffers this traffic and initiates the process of paging station 124 by all APs within the DS. When station 124 exits idle mode and reassociates with DS 100, for example through AP 116, server 130 is notified of this event and sends the buffered traffic to station 124 through its associated AP.

Battery life is an important consideration in portable devices. A primary means of increasing battery life in a portable device is to reduce the power used by the device. One approach to reducing power, particularly in digital devices, is to use idle or sleep modes, wherein major portions of the device are operated in low power modes, or disabled completely.

Such reduced power modes introduce additional complexity, however, into wireless devices. In accordance with IEEE 802.11 wireless networking standards, once a station (STA) is associated with an access point (AP) which provides wireless services to that station, a fairly constant exchange of messages between AP and station continues, performing tasks such as synchronization. For wireless stations, listening for, and responding to these messages consumes power.

The IEEE 802.11 standard defines optional power save modes in which the station signals to the AP it is associated with that it wishes to enter a sleep state. If the AP supports sleep states, the AP acknowledges the request, and begins buffering packets for the station. This allows the station to reduce power to its wireless circuitry, while still maintaining an association with a specific AP. The AP still sends out regular beacon transmissions; if an AP has packets buffered for a sleeping station, it indicates this in the beacon transmissions. Sleeping stations wake periodically and check these beacon transmissions to see if the AP has packets waiting for it. If there are packets waiting, the station exits sleep mode, and retrieves the packets. The packets may require further activity, such as accepting an incoming VOIP call, or if no further activity is required, the station may transition back to sleep mode. Note that during this sleep mode, the station is still associated with an AP.

Buffering packets for sleeping clients is an expensive task for APs, requiring large buffers and complex management strategies.

Revisions to the 802.11 standard, such as those contemplated in the referenced proposal, include the addition of an "idle mode" where a station is not required to maintain an active association with a specific AP in the DS while it is in the idle mode. It is contemplated that this new "idle mode" will result in more power savings, since the station is no longer associated with a particular AP. The proposal also specifies messages and behavior for the station to specify a set of traffic filters, indicating what traffic the station wishes to be notified of. The proposal is also quiet on how these are to be implemented.

According to the present invention, a sleep mode server 130 is established for DS 100. Stations 120, 122, 124 associate with APs which are part of the DS. In the example of FIG. 2, station 124 is associated with AP 116. In accordance with the present invention, when station 124 associated with AP 116 establishes filters indicating the types of traffic the station wishes to receive, AP 116 forwards these filters to server 130. When station 124 enters idle mode, it is disassociated from AP 116. AP 116 signals server 130 when station 124 enters idle mode. Server 130 then signals DS 100 that station 124 is associated with it, with server 130.

Once associated with server 130, all traffic destined for station 124 goes to server 130. When packets arrive at server 130 for idle station 124, server 130 applies the previously set filters. When a packet satisfying the filter criteria for station 124 is met, server 130 pages station 124 through all APs defined for DS 100. When station 124 exits idle mode on decoding a page, it reassociates with an AP, for example AP 116. This reassociation is broadcast to all APs in DS 100, which includes server 130. When server 130 receives this reassociation information it then forwards saved packets for station 124 to the station's current AP, now AP 116.

It should be noted that while server 130 may functionally resemble an AP in DS 100, it does not transmit or receive wireless traffic. Rather, it stores filter settings and buffers traffic for idle stations which have been associated with it, initiates paging for idle stations through all APs associated with the DS, and forwards buffered frames to those stations when they exit the idle state and reassociate with an AP in the DS.

Figure 3:
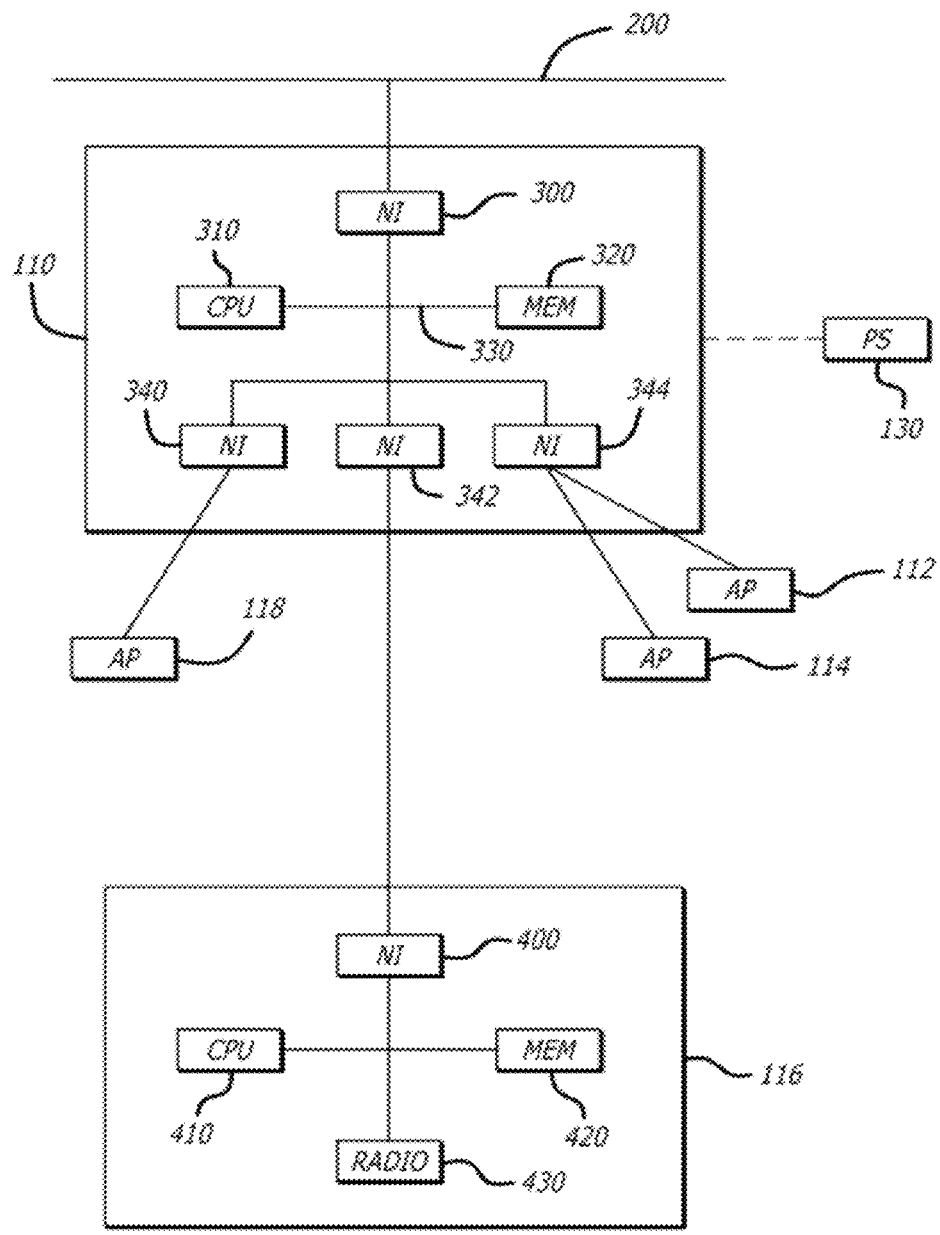
FIG. 3 shows a second block diagram of a DS including a paging server.

FIG. 3 shows a block diagram of a DS including a server according to an embodiment of the present invention. Portal 110 connects to wired network through network interface 300. Access points 112, 114, 116, and 118 also attach to portal 110. Portal 110 has CPU 310 and memory hierarchy 320 which communicates 330 with network interface 300 and network interfaces 340, 343, 344. Depending on the complexity of portal 110, the communication 330 among CPU, memory, and network interfaces may be simple interconnections and busses, or may be a more complex switching fabric. Memory hierarchy 320 typically contains high speed read-write memory as well as nonvolatile memory such as flash. Memory hierarchy 320 contains instructions and data which are executed or interpreted by CPU 310 to perform the various tasks and processes described herein. CPU 310 may be any suitable processor, such as those in the PowerPC, MIPS, or IA86 families.

Network interfaces 300, 340, 343, 344 are typically Ethernet interfaces, with interfaces 340, 342, 344 optionally supporting IEEE 802.3 Power over Ethernet (PoE) standards such as 802.3af and 802.3at to provide power to APs 112, 114, 116, 118.

Access points (APs) 112, 114, 116, 118 are shown in a block diagram as representative AP 116. Network interface 400 connects to CPU 410 and memory hierarchy 420, and to radio 430. Radio 430 is typically a radio module designed for use with the 802.11a, b, g, or n standards. Such radio modules are available from Atheros Communications, among others. An AP may contain one or more radio modules. As an example, separate radio modules may be used for 2.4 GHz 802.11b/g/n and 5 GHz 802.11a. CPU 410 is typically a processor designed for embedded systems, such as a member of the MIPS family. Memory hierarchy 420 usually includes high speed read-write memory such as DRAM, as well as non-volatile memory such as flash. Memory hierarchy 420 contains instructions and data which are executed or interpreted by CPU 410 to perform the various processes and tasks described herein. In operation, an AP such as AP 116 may have all the programming information, code and data, required already present in memory 420. In other implementations an AP may only contain enough programming information in memory 420 to start up the AP and download further programming information from portal 110. In a highly integrated AP, CPU 410, network interface 400, and much of the support logic required for memory hierarchy 420 and radio 430 may be integrated into one or more complex integrated circuits, usually identified as system-on-chip (SOC) design.

As is understood by the art, such embedded systems as APs 112, 114, 116, 118 and portal 110 run under the control of an operating system such as one of the many Linux family of systems, or a proprietary system such as VxWorks.

According to an embodiment of the present invention, server 130 is a function of DS 100. Since server 130 does not require the ability to handle radio traffic directly, server 130 may be implemented as a process running in DS 100, as an example, in portal 110. While paging server 130 may be run as a process in an AP such as AP 112, or 114, APs are usually more resource-limited than controllers, with controller 110 most likely containing more memory and a faster processor than those used in the attached APs. Paging server 130 may also be hosted on separate hardware, such as a repurposed AP. In one embodiment, such a repurposed AP need not contain radios 430, and may contain additional read-write memory in memory hierarchy 420 to support additional buffering of traffic for idle stations.

In an embodiment such as that shown in FIG. 3, portal 110 controls a plurality of APs, which may represent one or more distribution systems (DS). Similarly, portal 110 may host multiple instances of server 130, one for each DS it serves.

While the invention has been described in terms of several embodiments, the invention should not be limited to only those embodiments described, but can be practiced with modification and alteration within the spirit and scope of the appended claims. The description is this to be regarded as illustrative rather than limiting.

What is claimed is:

1. A non-transitory computer readable medium comprising instructions which, when executed by a hardware processor, causes performance of operations comprising:
   determining, by a server, that a client device associated with a first access point, is in an idle mode;
   responsive to determining that the client device is in the idle mode, signaling, by the server within a network of the client device, association of the client device with the server during the idle mode;
   storing, at the server, a first set of data destined for the client device;
   receiving, by the server, filter criteria indicating types of traffic the client device is to receive in the idle mode, the filter criteria established by the client device;
   determining, by the server, that the first set of data meets at least a subset of the filter criteria preset for the client device;
   paging, by the server, the client device through a plurality of access points that comprise the first access point upon the determination that the first set of data meets at least the subset of the filter criteria, the server being disparate from the plurality of access points;
   determining, by the server, that the client device has exited the idle mode; and
   responsive to determining that the client device has exited the idle mode: transmitting, by the server, to a second access point, the first set of data for forwarding to the client device.

2. The non-transitory computer readable medium of claim 1, wherein the second access point is the same as the first access point.

3. The non-transitory computer readable medium of claim 1, wherein the operations further comprise: receiving for storage, by the server, the first set of data from one of the plurality of access points.

4. The non-transitory computer readable medium of claim 1, wherein determining, by the server, that the client device has exited the idle mode is based on a re-association request originating from the client device.

5. The non-transitory computer readable medium of claim 1, wherein storing the first set of data further comprises: storing, by the server, the first set of data until the client device exits the idle mode.

6. The non-transitory computer readable medium of claim 1, wherein the operations further comprise:
filtering, by the server, a second set of data destined for the client device according to the filter criteria to obtain the first set of data;
discarding, by the server, data in the second set of data other than the first set of data.

7. The non-transitory computer readable medium of claim 6, further comprising:
receiving, by the server, the filter criteria that is received by the first access point from the client device.

8. The non-transitory computer readable medium of claim 1, wherein the server does not transmit or receive any data wirelessly.

9. The non-transitory computer readable medium of claim 1, wherein the server is physically different from the plurality of access points.

10. The non-transitory computer readable medium of claim 1, wherein storing the first set of data at the server comprises receiving the first set of data and refraining from forwarding the first set of data to the first access point.

11. A server comprising:
a hardware processor;
a processor-readable memory comprising instructions that configure the server to:
determine that a client device associated with a first access point, is in an idle mode;
responsive to determining that the client device is in the idle mode: signal, within a network of the client device, association of the client device with the server; store a first set of data destined for the client device;
receive filter criteria indicating types of traffic the client device is to receive in the idle mode, the filter criteria established by the client device;
determine that the first set of data meets at least a subset of filter criteria preset for the client device;
page the client device through a plurality of access points that comprise the first access point upon the determination that the first set of data meets at least the subset of the filter criteria, the server being disparate from the plurality of access points;
determine that the client device has exited the idle mode;
responsive to determining that the client device has exited the idle mode transmit to a second access point the first set of data for forwarding to the client device.

12. The system of claim 11, wherein the second access point is the same as the first access point.

13. The server of claim 11, further configured to: receive the first set of data from one of the plurality of access points.

14. The server of claim 11, wherein determining that the client device has exited the idle mode is based on a re-association request originating from the client device.

15. The server of claim 11, further configured to store the first set of data until the client device exits the idle mode.

16. The server of claim 11, further configured to:
filter a second set of data destined for the client device according to the filter criteria to obtain the first set of data;
discard data in the second set of data other than the first set of data.

17. The server of claim 16, further configured to receive the filter criteria that is received by the first access point from the client device.

18. the server of claim 11, wherein the server does not transmit or receive any data wirelessly.

19. The server of claim 11, wherein storing the first set of data comprises receiving the first set of data and refraining from forwarding the first set of data to the first access point.

20. A method, comprising:
determining, by a server, that a client device associated with a first access point is in an idle mode;
responsive to determining that the client device is in the idle mode: signaling, by the server, within a network of the client device, association of the client device with the server;
storing, by the server, a first set of data destined for the client device;
receiving, by the server, filter criteria indicating types of traffic the client device is to receive in the idle mode, the filter criteria established by the client device;
determining, by the server, that the first set of data meets at least a subset of the filter criteria preset for the client device;
paging the client device through a plurality of access points that comprise the first access point upon the determination that the first set of data meets at least the subset of the filter criteria, the server being disparate from the plurality of access points;
determining that the client device has exited the idle mode; and
responsive to determining that the client device has exited the idle mode: transmitting to a second access point, the first set of data.

21. A method of supporting wireless stations, comprising:
associating, by a station, with a first access point of a plurality of access points comprised in a wireless network that also comprises the station and a server disparate from the plurality of access points, wherein the server does not transmit or receive wireless traffic;
providing, by the station, a set of filters to the first access point, the set of filters defining types of traffic for transmitting to the station in an idle mode and providing the set of filters to the server;
entering, by the station, into an idle mode, wherein the station is disassociated from the plurality of access points;
associating, by the station, with the server during the idle mode;
receiving, by the station via a second one of the plurality of access points, a page from the server that a packet satisfying a filter criteria is received;
decoding, by the station, the page received from the server;
exiting, by the station, the idle mode upon decoding the page;
re-associating, by the station, with a second access point, such that the re-association is broadcast to the plurality of access points and the server; and
receiving, by the station, a buffered message comprising the packet, the buffered message being received from the server via the second access point.

* * * * *

UNITED STATES PATENT AND TRADEMARK OFFICE
CERTIFICATE OF CORRECTION

| | | |
|---|---|---|
| PATENT NO. | : 9,265,020 B2 | |
| APPLICATION NO. | : 13/417102 | |
| DATED | : February 16, 2016 | |
| INVENTOR(S) | : Partha Narasimhan | |

It is certified that error appears in the above-identified patent and that said Letters Patent is hereby corrected as shown below:

In the claims,

In column 5, line 54, in Claim 12, delete "system" and insert -- server --, therefor.

In column 6, line 6 approx., in Claim 18, delete "the" and insert -- The --, therefor.

Signed and Sealed this
Thirty-first Day of May, 2016

Michelle K. Lee
*Director of the United States Patent and Trademark Office*